(12) United States Patent
Liu et al.

(10) Patent No.: US 10,459,996 B2
(45) Date of Patent: Oct. 29, 2019

(54) BIG DATA BASED CROSS-DOMAIN RECOMMENDATION METHOD AND APPARATUS

(71) Applicant: Baidu Online Network Technology (Beijing) Co., Ltd., Beijing (CN)

(72) Inventors: Zhiqiang Liu, Beijing (CN); Zhiyong Shen, Beijing (CN)

(73) Assignee: BAIDU ONLINE NETWORK TECHNOLOGY (BEIJING) CO., LTD, Beijing (CN)

( * ) Notice: Subject to any disclaimer, the term of this patent is extended or adjusted under 35 U.S.C. 154(b) by 0 days.

(21) Appl. No.: 15/564,323

(22) PCT Filed: Jun. 20, 2016

(86) PCT No.: PCT/CN2016/086407
§ 371 (c)(1),
(2) Date: Oct. 4, 2017

(87) PCT Pub. No.: WO2017/107416
PCT Pub. Date: Jun. 29, 2017

(65) Prior Publication Data
US 2019/0050484 A1    Feb. 14, 2019

(30) Foreign Application Priority Data

Dec. 23, 2015    (CN) .......................... 2015 1 0979783

(51) Int. Cl.
*G06F 7/00*         (2006.01)
*G06F 16/9535*      (2019.01)
(Continued)

(52) U.S. Cl.
CPC ........ *G06F 16/9535* (2019.01); *G06F 16/313* (2019.01); *G06F 16/3346* (2019.01);
(Continued)

(58) Field of Classification Search
CPC .................................................. G06F 16/3346
See application file for complete search history.

(56) References Cited

U.S. PATENT DOCUMENTS

| 2011/0093361 | A1  | 4/2011  | Morales |
|---|---|---|---|
| 2013/0268357 | A1* | 10/2013 | Heath ............... H04L 63/00 705/14.53 |
| 2016/0117595 | A1  | 4/2016  | Zhang |

FOREIGN PATENT DOCUMENTS

| CN | 102479366 | 5/2012 |
|---|---|---|
| CN | 104281622 | 1/2015 |

(Continued)

OTHER PUBLICATIONS

International Search Report in PCT/CN2016/086407 dated Sep. 29, 2016 in 2 pages.

*Primary Examiner* — Ajith Jacob
(74) *Attorney, Agent, or Firm* — Knobbe Martens Olson & Bear, LLP (57) ABSTRACT

The present disclosure discloses a big data based cross-domain recommendation method and apparatus. Correlation between domains and correlation between user behavior characteristics are obtained by connection and cross analysis of a user's online input and offline behaviors in different domains, and content is recommended to the user according to the established correlation. The technical solution of the present disclosure is applied to the precise consumer brand recommendation to users and the precise positioning of potential consumer brand customers in the Internet+retail area. The technical solution can solve a series of problems, such as cross-drainage of users in multiple domains, precise marketing and precise positioning of potential customers, and the effect is very obvious. From the offline simulation test and online real consumption test, the brand recommen- (Continued)

dation and user positioning accuracy is largely improved, while the GMV of the offline retail is largely improved.

13 Claims, 6 Drawing Sheets

(51) Int. Cl.
    *G06F 16/33*     (2019.01)
    *G06F 16/31*     (2019.01)
    *G06F 17/18*     (2006.01)
    *G06Q 30/02*     (2012.01)

(52) U.S. Cl.
    CPC ......... *G06F 17/18* (2013.01); *G06Q 30/0282* (2013.01); *G06Q 30/02* (2013.01)

(56) References Cited

FOREIGN PATENT DOCUMENTS

| | | |
|---|---|---|
| CN | 104317945 | 1/2015 |
| CN | 105117418 | 12/2015 |
| CN | 105630946 | 6/2016 |
| JP | 2005-222390 | 8/2005 |

\* cited by examiner

```
th topic :
    Infant : 22569
    Children : 13983
    Newborn baby : 9905
    Milk powder : 7673
    Children : 7621
    Fever : 7251
    What's going on : 5765
    Sleep : 5260
    Cough : 5258
    Lactation : 4436
    Children : 4395
    Breast milk : 4024
    What to eat : 3521
    Pregnant woman : 3513
    Symptom : 3498
    Confinement : 3446
    Cesarean : 3301
    Children : 3254
    Influenza : 3041
    Excrement : 2928
```

```
41 th topic :
    Les Enphants : 3387
    Yeehoo : 1557
    Senbodulun : 1456
    Loucy Miel : 910
    OCTmami : 819
    Piyo Piyo : 807
    Gennies : 674
    Amery : 592
    Xianpinlai : 418
    Sinaina : 357
    Hello kitty : 318
    Barbie : 314
    ALLO&UGH : 312
    Nike : 223
    Paw in paw : 206
    DrKong : 205
    Adidas : 193
    Bear Famania : 173
    CHOW TAI FOOK : 166
    Adidas Baby : 165
```

Fig. 9

```
46 th topic :
    Mask : 18248
    South Korea : 16981
    Brand : 9616
    Cosmetic : 9102
    Suit : 4673
    Brand : 4539
    Skin care : 4101
    Shoppe : 3945
    Japan : 3427
    Eye cream : 2998
    Product : 2923
    Duty-free shop : 2877
    Perfume : 2815
    Chanel : 2785
    Series : 2697
    Lancome : 2666
    Estee lauder : 2637
    Cushion : 2519
    Darling Sheet : 2476
    Lipstick : 2329
```

```
10 th topic :
    ESTEE LAUDER : 4912
    CLINIQUE : 2645
    DIOR : 1136
    CHANEL : 857
    SK-II : 692
    LANCOME : 526
    Make up forever : 451
    BIOTHERM : 300
    L'OREAL : 280
    AUPRES : 165
    GUERLAIN : 156
    KOSE : 142
    DHC : 138
    SWAROCSKI : 117
    SHISEIDO : 86
    SWAROCSKI : 66
    PRECIS : 61
    ELIZABERHARDEN : 58
    OLAY : 54
    BELLE : 48
```

BIG DATA BASED CROSS-DOMAIN RECOMMENDATION METHOD AND APPARATUS

CROSS-REFERENCE TO RELATED APPLICATION

This application claims the priority from Chinese Application No. 201510979783.7, filed on Dec. 23, 2015, the entire disclosure of which is hereby incorporated by reference.

TECHNICAL FIELD

The present disclosure relates to the field of internet, in particular to a big data based cross-domain recommendation method and a big data based cross-domain recommendation apparatus.

BACKGROUND

Existing methods for analyzing user behavior in multiple domains is relatively simple. A user close or similar to a given target user is sought for in different domains, so as to position the target user and generate content to be recommended to the user.

The existing technology has the following disadvantages:

The interpretability is poor, so that a correlation between behavior characteristics in different domains cannot be established;

There is too much human intervention, it is requisite to define the means for measuring the user distance and threshold; and The expandability is poor, a model cannot be quickly established for, and recommendation cannot be made to a new based on the modeling result.

SUMMARY

A technical problem to be solved by the present disclosure is to provide a big data based cross-domain recommendation method and apparatus so as to provide more precise recommendation service to users.

A technical solution used in the present disclosure is the big data based cross-domain recommendation method, comprising:

modeling a topic separately based on an online input record and an offline behavior record of a user in a specific user set, the user in the specific user set having both the online input record and the offline behavior record;

determining a transition probability of transitioning from each online input topic to each offline behavior topic according to a topic modeling result;

recommending content of an offline behavior to a target user based on the transition probability and an online input record of the target user.

Further, the offline behavior record includes an offline consumption record;

the online input record includes a search record obtained by a search engine, and/or an input record in a particular application obtained by an input method or a voice receiving device; and the type of the particular application includes at least one of the following: chat software, search engine, social software and online shopping client software.

Further, the offline consumption record includes an offline consumption topic and an offline consumption brand;

in case the online input record is a search record obtained by a search engine, the modeling a topic separately based on an online input record and an offline behavior record of the user in the specific user set comprises:

modeling a topic based on the offline consumption record of the user in the specific user set to obtain a probability P(brand|consumption topic) of consuming each brand in each consumption topic, and a probability P(consumption topic|user) of consuming each consumption topic by each user; and modeling a topic (LDA) based on an online search record of the user in the specific user set to obtain a probability P(search word|search topic) of inputting each search word in each search topic and a probability P(search topic|user) of searching each search topic by each user.

Further, the determining a transition probability of transitioning from each online input topic to each offline behavior topic according to a topic modeling result comprises:

using a two-level probability graph model to obtain a transition probability P(consumption topic|search topic) from each search topic to each consumption topic, based on the P(search topic|user) corresponding to each user and the brand consumption data of the user in the specific user set, or based on the P(brand|consumption topic), the P(search topic|user) corresponding to the each user and the brand consumption data of the user in the specific user set.

Further, as an optional technical solution, the recommending content of an offline behavior to a target user based on the transition probability and an online input record of the target user comprises A1: determining a probability $P_0$(brand|user) of consuming each brand by the target user having the search record obtained by a search engine in accordance with the following formula:

$$P_0(\text{brand}|\text{user}) = \sum_{\text{Consumption topic}} \left[ P(\text{brand}|\text{consumption topic}) \times \sum_{\text{Search topic}} (P(\text{consumption topic}|\text{search topic}) \times P_0(\text{search topic}|\text{user})) \right]$$

wherein, $$\sum_{\text{Consumption topic}}$$

refers to the summation of all consumption topics involved in the offline behavior record of the user in the particular set, $$\sum_{\text{Search topic}}$$

refers to the summation of all search topics in the search record of the target user, and $P_0$(search topic|user) refers to the probability of searching each search topic by the target user as determined according to the search record of the target user; and A2: recommending a brand to the target user according to the $P_0$(brand|user).

Further, as another optional technical solution, in case the target user has an offline consumption record, the recommending content of an offline behavior to the target user based on an online input record of the target user and the transition probability comprises:

B1: determining a probability $P_0(\text{brand}|\text{user})$ of consuming each brand by the target user in accordance with the following formula:

$$P_0(\text{brand}|\text{user}) = \sum_{\text{Consumption topic}} [P_0(\text{brand}|\text{consumption topic}) \times [P_0(\text{consumption topic}|\text{user}) + \sum_{\text{Search topic}} (P(\text{consumption topic}|\text{search topic}) \times P_0(\text{search topic}|\text{user}))]]$$

wherein, $P_0(\text{brand}|\text{consumption topic})$ refers to a probability of consuming each brand in each consumption topic by the target user as determined according to the consumption record of the target user, $P_0(\text{consumption topic}|\text{user})$ refers to a probability of consuming each consumption topic by the target user as determined according to the consumption of the target user, $$\sum_{\text{Consumption topic}}$$

refers to the summation of all consumption topics involved in the offline behavior record of the user in the particular set, $$\sum_{\text{Search topic}}$$

refers to the summation of all search topics in the search record of the target user, and $P_0(\text{search topic}|\text{user})$ refers to the probability of searching each search topic by the target user as determined according to the search record of the target user; and B2: recommending a brand to the target user according to the $P_0(\text{brand}|\text{user})$.

The present disclosure also provides a big data based cross-domain recommendation apparatus, comprising:

a modeling module, used for modeling a topic separately based on an online input record and an offline behavior record of a user in a specific user set, the user in the specific user set having both the online input record and the offline behavior record;

a calculation module, used for determining a transition probability of transitioning from each online input topic to each offline behavior topic according to a topic modeling result; and a recommendation module, used for recommending content of an offline behavior to a target user based on the transition probability and an online input record of the target user.

Further, the offline behavior record includes an offline consumption record;

the online input record includes a search record obtained by a search engine, and/or an input record in a particular application obtained by an input method or a voice receiving device; and the type of the particular application includes at least one of the following: chat software, search engine, social software and online shopping client software.

Further, the offline consumption record includes an offline consumption topic and an offline consumption brand;

in case the online input record is a search record obtained by a search engine, the modeling module is used for:

modeling a topic based on the offline consumption record of the user in the specific user set to obtain a probability $P(\text{brand}|\text{consumption topic})$ of consuming each brand in each consumption topic, and a probability $P(\text{consumption topic}|\text{user})$ of consuming each consumption topic by each user; and modeling a topic based on an online search record of the user in the specific user set to obtain a probability $P(\text{search word}|\text{search topic})$ of inputting each search word in each search topic and a probability $P(\text{search topic}|\text{user})$ of searching each search topic by each user.

Further, the calculation module is specifically used for:

using a two-level probability graph model to obtain a transition probability $P(\text{consumption topic}|\text{search topic})$ from each search topic to each consumption topic, based on the $P(\text{search topic}|\text{user})$ corresponding to each user and the brand consumption data of the user in the specific user set, or based on the $P(\text{brand}|\text{consumption topic})$, the $P(\text{search topic}|\text{user})$ corresponding to the each user and the brand consumption data of the user in the specific user set.

Further, as an optional technical solution, the recommendation module is specifically used for:

determining a probability $P_0(\text{brand}|\text{user})$ of consuming each brand by the target user having the search record obtained by a search engine in accordance with the following formula:

$$P_0(\text{brand}|\text{user}) = \sum_{\text{Consumption topic}} [P(\text{brand}|\text{consumption topic}) \times \sum_{\text{Search topic}} (P(\text{consumption topic}|\text{search topic}) \times P_0(\text{search topic}|\text{user}))]$$

wherein, $$\sum_{\text{Consumption topic}}$$

refers to the summation of all consumption topics involved in the offline behavior record of the user in the particular set, $$\sum_{\text{Search topic}}$$

refers to the summation of all search topics in the search record of the target user, and $P_0(\text{search topic}|\text{user})$ refers to the probability of searching each search topic by the target user as determined according to the search record of the target user; and recommending a brand to the target user according to the $P_0(\text{brand}|\text{user})$.

Further, as another optional technical solution, in case the target user has an offline consumption record, the recommendation module is specifically used for:

B1: determining a probability $P_0(\text{brand}|\text{user})$ of consuming each brand by the target user in accordance with the following formula:

$$P_0(\text{brand} | \text{user}) =$$

$$\sum_{\text{Consumption topic}} [P_0(\text{brand} | \text{consumption topic}) \times [P_0(\text{consumption topic} | \text{user}) + \sum_{\text{Search topic}} (P(\text{consumption topic} | \text{search topic}) \times P_0(\text{search topic} | \text{user}))]]$$

wherein, $P_0$(brand|consumption topic) refers to a probability of consuming each brand in each consumption topic by the target user as determined according to the consumption record of the target user, $P_0$ (consumption topic|user) refers to a probability of consuming each consumption topic by the target user as determined according to the consumption of the target user, $$\sum_{\text{Consumption topic}}$$

refers to the summation of all consumption topics involved in the offline behavior record of the user in the particular set, $$\sum_{\text{Search topic}}$$

refers to the summation of all search topics in the search record of the target user, and $P_0$(search topic|user) refers to the probability of searching each search topic by the target user as determined according to the search record of the target user; and B2: recommending a brand to the target user according to the $P_0$(brand|user).

With the technical solutions above, the present disclosure has the following advantages at least:

According to the big data based cross-domain recommendation method and apparatus as described in the present disclosure, a correlation between fields and a correlation between user behavior characteristics are obtained by connection and cross analysis of a user's online input and offline behaviors in different domains, and content is recommended to the user according to the established correlation. The technical solution of the present invention is applied to the precise consumer brand recommendation to users and the precise positioning of potential consumer brand customers in the Internet+retail area. The technical solution can solve a series of problems, such as cross-drainage of users in multiple domains, precise marketing and precise positioning of potential customers, and the effect is very obvious. From the offline simulation test and online real consumption test, the brand recommendation and user positioning accuracy is largely improved, while the gross merchandise volume (GMV) of the offline retail is largely improved.

DETAILED DESCRIPTION OF EMBODIMENTS

Figure 1:
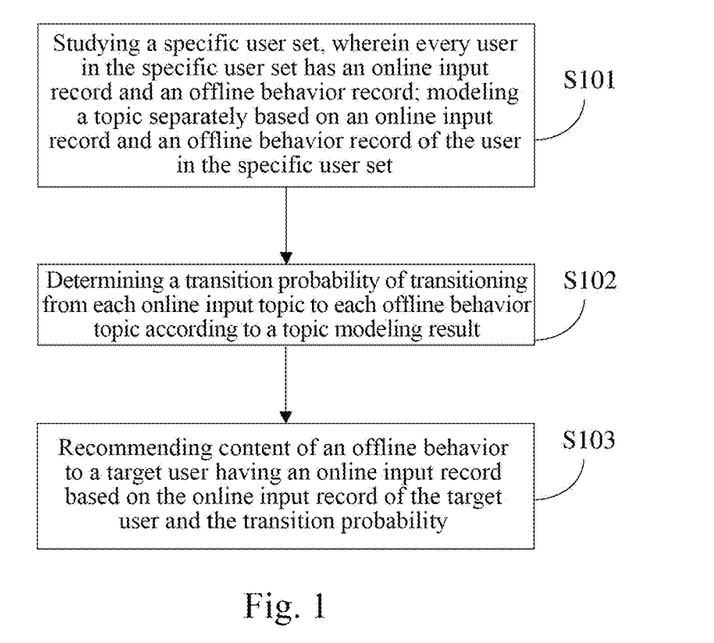
FIG. 1 is a flow chart illustrating a big data based cross-domain recommendation method according to a first embodiment of the present disclosure.

In order to further describe the technical means used in the present disclosure for achieving the expected purposes and the effects thereof, the present the disclosure will be described below in combination with drawings and preferred embodiments. According to a first embodiment of the present disclosure, a big data based cross-domain recommendation method, as shown in FIG. 1, comprises the following specific steps:

Step S101: studying a specific user set, wherein every user in the specific user set has an online input record and an offline behavior record; modeling a topic separately based on an online input record and an offline behavior record of the user in the specific user set.

Specifically, the offline behavior record in the embodiment includes an offline consumption record.

The online input record includes a search record obtained by a search engine, and/or an input record in a particular application obtained by an input method or a voice receiving device; and the type of the particular application includes at least one of the following: chat software, search engine, social software and online shopping client software.

Further, the offline consumption record includes an offline consumption topic and an offline consumption brand.

In step S101, in case the online input record is a search record obtained by a search engine, the modeling a topic separately based on an online input record and an offline behavior record of a user in the specific user set comprises:

modeling a topic based on the offline consumption record of the user in the specific user set to obtain a probability P(brand|consumption topic) of consuming each brand in each consumption topic, and a probability P(consumption topic|user) of consuming each consumption topic by each user; and modeling a topic based on an online search record of the user in the specific user set to obtain a probability P(search word|search topic) of inputting each search word in each search topic and a probability P(search topic|user) of searching each search topic by each user.

Step S102: determining a transition probability of transitioning from each online input topic to each offline behavior topic according to a topic modeling result.

Specifically, step S102 comprises: using a two-level probability graph model to obtain a transition probability P(consumption topic|search topic) from each search topic to each consumption topic, based on the P(search topic|user) corresponding to each user and the brand consumption data of the user in the specific user set, or preferably based on the P(brand|consumption topic), the P(search topic|user) corresponding to the each user and the brand consumption data of the user in the specific user set.

Step S103: recommending content of an offline behavior to a target user having an online input record based on the online input record of the target user and the transition probability.

Specifically, step S103 comprises:

A1: determining a probability $P_0$(brand|user) of consuming each brand by the target user having the search record obtained by a search engine in accordance with the following formula:

$$P_0(\text{brand}|\text{user}) = \sum_{\text{Consumption topic}} [P(\text{brand}|\text{consumption topic}) \times \sum_{\text{Search topic}} (P(\text{consumption topic}|\text{search topic}) \times P_0(\text{search topic}|\text{user}))]$$

wherein, $$\sum_{\text{Consumption topic}}$$

refers to the summation of all consumption topics involved in the offline behavior record of the user in the particular set, $$\sum_{\text{Search topic}}$$

refers to the summation of all search topics in the search record of the target user, and $P_0$(search topic|user) refers to the probability of searching each search topic by the target user as determined according to the search record of the target user; and A2: recommending a brand to the target user according to the $P_0$ (brand|user).

Further, recommend a brand with the maximum consumption probability or the top several brands in the $P_0$(brand|user) to the target user.

Figure 2:
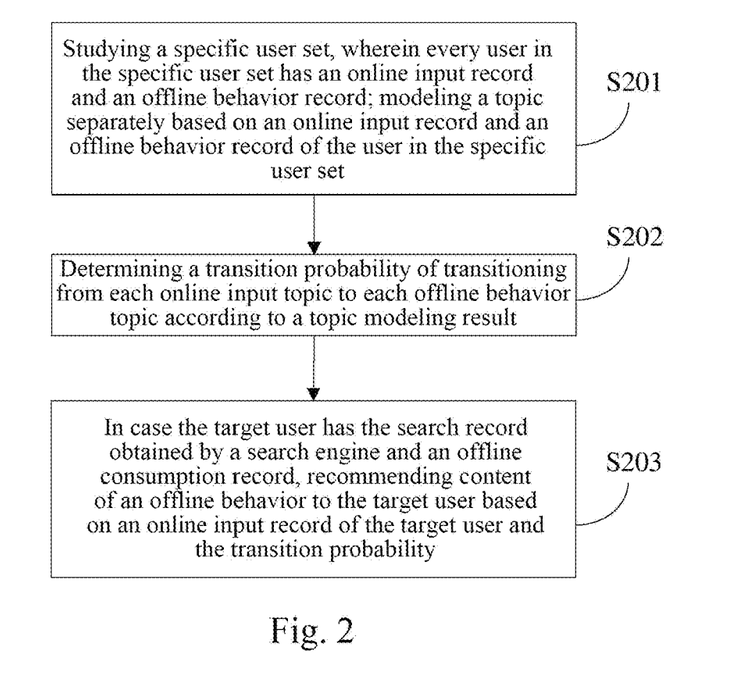
FIG. 2 is a flow chart illustrating a big data based cross-domain recommendation method according to a second embodiment of the present disclosure.

A big data based cross-domain recommendation method according to a second embodiment of the present disclosure is substantially identical with that according to the first embodiment, that is, steps s201 to s202 are identical with the steps S101 to S102 in the first embodiment, but the difference, as shown in FIG. 2, is that the step S203 in the method according to the embodiment includes the following specific contents:

In case the target user has the search record obtained by a search engine and an offline consumption record, the recommending content of an offline behavior to the target user based on an online input record of the target user and the transition probability comprises:

B1: determining a probability $P_0$(brand|user) of consuming each brand by the online user in accordance with the following formula:

$$P_0(\text{brand}|\text{user}) = \sum_{\text{Consumption topic}} [P_0(\text{brand}|\text{consumption topic}) \times [P_0(\text{consumption topic}|\text{user}) + \sum_{\text{Search topic}} (P(\text{consumption topic}|\text{search topic}) \times P_0(\text{search topic}|\text{user}))]]$$

wherein, $P_0$(brand|consumption topic) refers to a probability of consuming each brand in each consumption topic by the online user as determined according to the consumption record of the online user, $P_0$ (consumption topic|user) refers to a probability of consuming each consumption topic by the online user as determined according to the consumption of the online user, $$\sum_{\text{Consumption topic}}$$

refers to the summation of all consumption topics involved in the offline behavior record of the user in the particular set, $$\sum_{\text{Search topic}}$$

refers to the summation of all search topics in the search record of the target user, and $P_0$(search topic|user) refers to the probability of searching each search topic by the target user as determined according to the search record of the target user; and B2: recommending a brand to the target user according to the $P_0$(brand|user).

Figure 3:
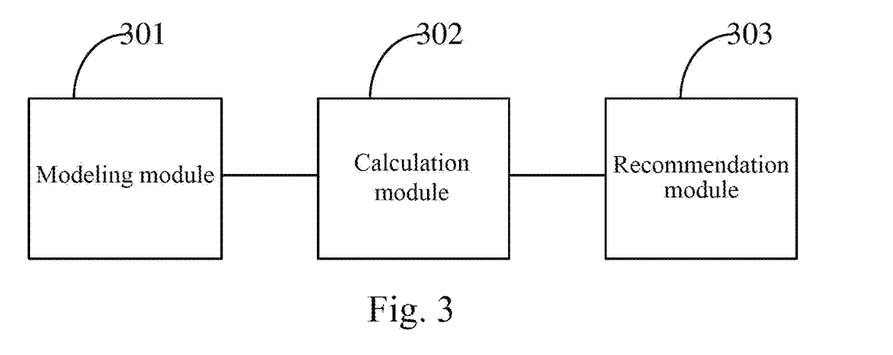
FIG. 3 is a schematic diagram illustrating a composition structure of a big data based cross-domain recommendation apparatus according to a third embodiment of the present disclosure.

A third embodiment of the present disclosure is corresponding to the first embodiment and describes a big data based cross-domain recommendation apparatus, as shown in FIG. 3, comprising the following components:

1) A modeling module 301, used for modeling a topic separately based on an online input record and an offline behavior record of a user in a specific user set, the user in the specific user set having both the online input record and the offline behavior record.

Specifically, the offline behavior record in the embodiment includes an offline consumption record.

The online input record includes a search record obtained by a search engine, and/or an input record in a particular application obtained by an input method or a voice receiving device; and the type of the particular application includes at least one of the following: chat software, search engine, social software and online shopping client software.

Further, the offline consumption record includes an offline consumption topic and an offline consumption brand.

In case the online input record is a search record obtained by a search engine, the modeling module is used for:

modeling a topic based on the offline consumption record of the user in the specific user set to obtain a probability P(brand|consumption topic) of consuming each brand in each consumption topic, and a probability P(consumption topic|user) of consuming each consumption topic by each user; and modeling a topic (Latent Dirichlet Allocation, LDA in short) based on an online search record of the user in the specific user set to obtain a probability P(search word|search topic) of inputting each search word in each search topic and a probability P(search topic|user) of searching each search topic by each user.

2) A calculation module 302, used for determining a transition probability of transitioning from each online input topic to each offline behavior topic according to a topic modeling result.

Specifically, the calculation module 302 is used for: using a two-level probability graph model to obtain a transition probability P(consumption topic|search topic) from each search topic to each consumption topic, based on the P(search topic|user) corresponding to each user and the brand consumption data of the user in the specific user set, or preferably based on the P(brand|consumption topic), the P(search topic|user) corresponding to the each user and the brand consumption data of the user in the specific user set.

3) A recommendation module 303, used for recommending content of an offline behavior to a target user having an online input record based on the online input record of the target user and the transition probability.

Specifically, the recommendation module 303 is used for:

determining a probability $P_0(\text{brand}|\text{user})$ of consuming each brand by the target user having the search record obtained by a search engine in accordance with the following formula:

$$P_0(\text{brand}|\text{user}) = \sum_{\text{Consumption topic}} [P(\text{brand}|\text{consumption topic}) \times \sum_{\text{Search topic}} (P(\text{consumption topic}|\text{search topic}) \times P_0(\text{search topic}|\text{user}))]$$

wherein, $$\sum_{\text{Consumption topic}}$$

refers to the summation of all consumption topics involved in the offline behavior record of the user in the particular set, $$\sum_{\text{Search topic}}$$

refers to the summation of all search topics in the search record of the target user, and $P_0(\text{search topic}|\text{user})$ refers to the probability of searching each search topic by the target user as determined according to the search record of the target user; and recommending a brand to the target user according to the $P_0(\text{brand}|\text{user})$. For example, recommending a brand with the maximum consumption probability or the top several brands in the $P_0(\text{brand}|\text{user})$ to the target user.

A big data based cross-domain recommendation apparatus according to a fourth embodiment of the present disclosure is substantially identical with that according to the third embodiment, and the difference is that the recommendation module 303 is specifically used for:

In case the target user has the search record obtained by a search engine and an offline consumption record, the recommending content of an offline behavior to the target user based on an online input record of the target user and the transition probability comprises:

B1: determining a probability $P_0(\text{brand}|\text{user})$ of consuming each brand by the online user in accordance with the following formula:

$$P_0(\text{brand}|\text{user}) = \sum_{\text{Consumption topic}} [P_0(\text{brand}|\text{consumption topic}) \times [P_0(\text{consumption topic}|\text{user}) + \sum_{\text{Search topic}} (P(\text{consumption topic}|\text{search topic}) \times P_0(\text{search topic}|\text{user}))]]$$

wherein, $P_0(\text{brand}|\text{consumption topic})$ refers to a probability of consuming each brand in each consumption topic by the online user as determined according to the consumption record of the online user, $P_0$ (consumption topic|user) refers to a probability of consuming each consumption topic by the online user as determined according to the consumption of the online user, $$\sum_{\text{Consumption topic}}$$

refers to the summation of all consumption topics involved in the offline behavior record of the user in the particular set, $$\sum_{\text{Search topic}}$$

refers to the summation of all search topics in the search record of the target user, and $P_0(\text{search topic}|\text{user})$ refers to the probability of searching each search topic by the target user as determined according to the search record of the target user; and B2: recommending a brand to the target user according to the $P_0(\text{brand}|\text{user})$.

According to a fifth embodiment of the present disclosure, a brand is recommended according to the transition from a Baidu search content into mall consumption based on the embodiments above. In combination with FIG. 4 to FIG. 10, such embodiment introduces an application example of the present disclosure.

The main idea of the embodiment of the present disclosure is that: the data of a user in a domain 1 (mall consumption) and the data of the user in a domain 2 (searched by Baidu's search engine) are subjected to onboarding and cross modeling, and the modeling process is shown as follows:

step 1: modeling a topic and analyzing the mall consumption data of the user to obtain cluster feature(consumption topic) information of a brand and the user's consumption weights in different clusters;

step 2: modeling a topic and analyzing the Baidu search data of the user to obtain clustering characteristic (search topic) information of a brand and the user's distribution weights in different clusters;

step 3: assuming that there is a probability transition relationship between every search topic and every consumption topic, and the user transits the search topic into the consumption topic according to the probability transition relationship so as to consume brands in different consumption topics; and using the results from step 1 and step 2 to reversely infer the correlation between the search topic and the consumption topic; and step 4: after obtaining the correlation, providing more accurate recommendation service for the existing user and new user respectively, and positioning the potential target customers of a given band more accurately.

Figure 4:
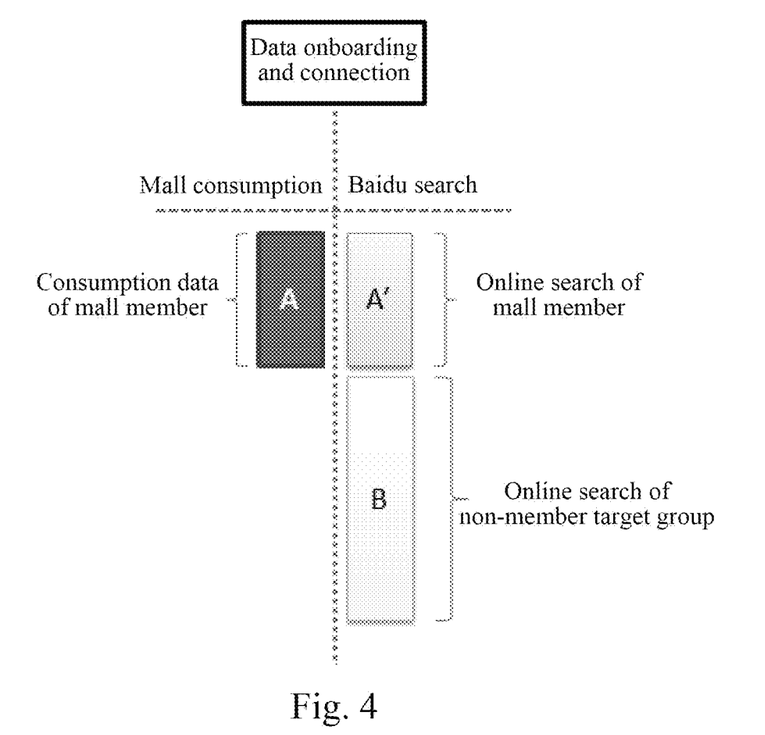
FIG. 4 is a schematic diagram illustrating onboarding and connection of mall consumption data and Baidu search data of a specific user set according to a fifth embodiment of the present disclosure.

On the basis the problem solving ideas above, the process of recommending a brand based on the transition from a Baidu search content into mall consumption is detailed as follows:

At the first stage, determining user objects of study, that is a specific user set, the mall consumption data and the Baidu search data of the specific user set are subjected to onboarding and connection.

As shown in FIG. 4, A on the left refers to the consumption data of a mall member, A' on the right refers to the Baidu search data of the mall member, and B on the right refers to the Baidu search data of a target user of a mall. It may be seen that a mall member set A' having both the offline consumption data and online search data is selected as the user object of study in the embodiment.

Figure 5:
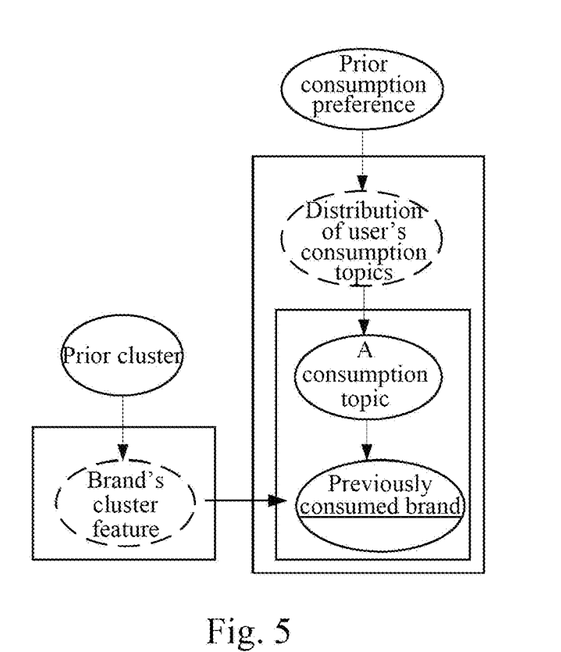
FIG. 5 is a schematic diagram illustrating modeling of mall consumption data of a user in a mall member set A' according to a fifth embodiment of the present disclosure.
Figure 6:
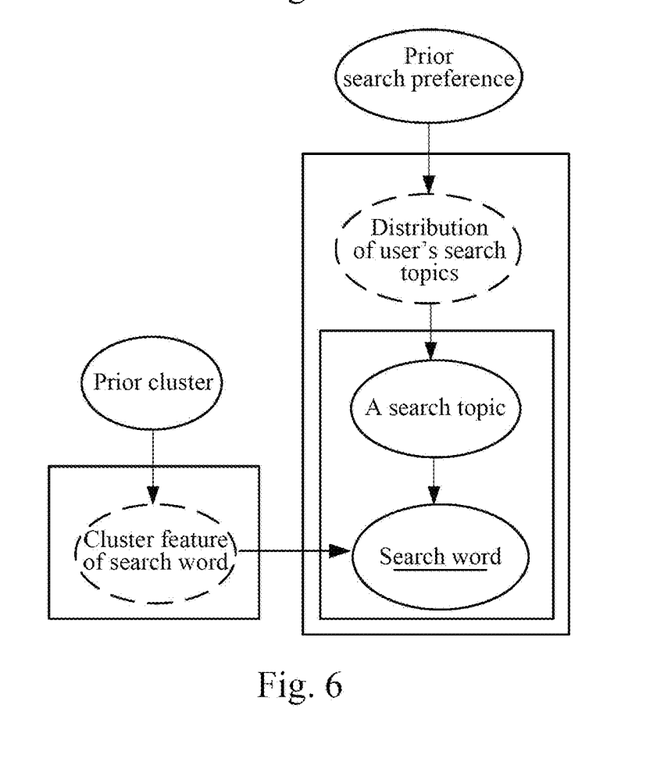
FIG. 6 is a schematic diagram illustrating modeling of Baidu search data of a user in a mall member set A' according to a fifth embodiment of the present disclosure.

At the second stage, a topic is subjected to LDA modeling based on the online search data and offline consumption data of a user in the mall member set A', and the modeling process is as follows:

as shown in FIG. 5, the mall consumption data of the user in the mall member set A' is subjected to LDA modeling to obtain the clustering characteristic P(brand|consumption topic) of a brand and the consumption type distribution P(consumption topic|user) of each user according to the brand previously consumed by the user. The brand clustering characteristic refers to the probability of consuming each brand in each consumption topic, and the consumption type distribution of each user refers to the probability of consuming each consumption topic by the user.

As shown in FIG. 6, the Baidu search data of the user in the mall member set A' is subjected to LDA modeling so as to obtain the clustering characteristic P(search word|search topic) of a search word and the search topic distribution P(search topic|user) of each user according to the word searched by the user. The search work clustering characteristic refers to the probability of inputting each search word in each search topic, and the search topic distribution of each user refers to the probability of searching each search topic by each user.

Figure 7:
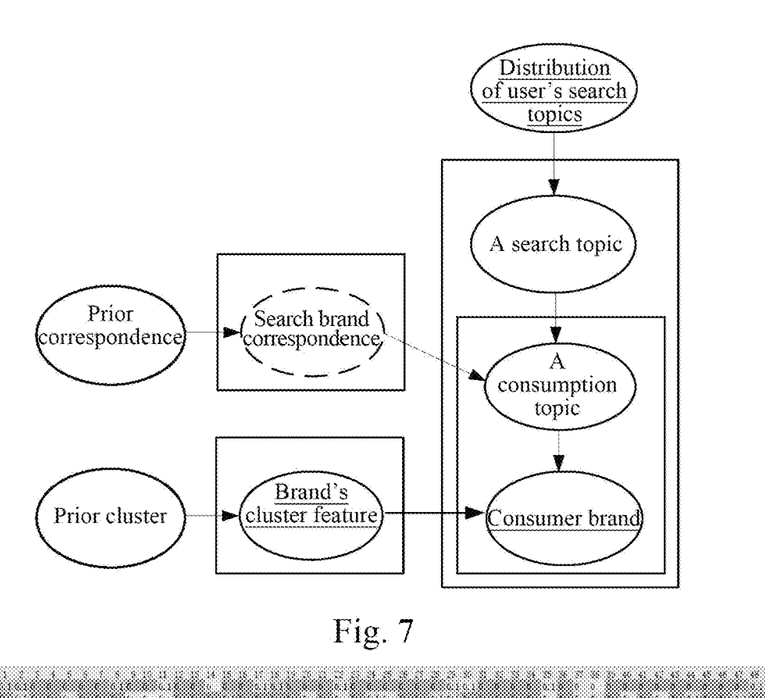
FIG. 7 is a schematic diagram illustrating a transition probability from a search topic to a consumption topic as determined by using a double-level probability graph model according to a fifth embodiment of the present disclosure.

At the third stage, a recommendation is made according to the modeling results.

As shown in FIG. 7, based on the brand's cluster features, user's search topic distribution and user's actual brand consumption history that are obtained in the previous stages, a double-level probability graph model is used to obtain the transition probability P(consumption topic|search topic) between the search topic and the consumption topic.

Content to be recommended to the target user is generated according to the following formula:

$$P_0(\text{brand}|\text{user}) = \sum_{\text{Consumption topic}} \begin{bmatrix} P_0(\text{brand}|\text{consumption topic}) \times \\ [P_0(\text{consumption topic}|\text{user}) + \sum_{\text{Search topic}} \\ (P(\text{consumption topic}|\text{search topic}) \times \\ P_0(\text{search topic}|\text{user}))] \end{bmatrix}$$

wherein, $P_0$(brand|consumption topic) refers to a probability of consuming each brand in each consumption topic by the online user as determined according to the consumption record of the online user, $P_0$ (consumption topic|user) refers to a probability of consuming each consumption topic by the online user as determined according to the consumption record of the online user.

The target user may be a user without real consumption history data, but the target user shall at least have the Baidu search data for determining a $P_0$ (search topic|user). If there are no real consumption history data, the $P_0$(search topic|user) in the formula above may be replaced with 0.

The technical effects of the embodiment will be introduced briefly as follows.

Firstly, the solution may make full use of the advantages of Baidu big data to largely promote the business in other domains, so that the real value of the big data is developed, and the true intelligent Internet+onboarding between online and offline data are realized.

Secondly, combining the offline consumption data is helpful for Baidu to understand the visitors well, thereby realizing more accurate and full user description. A closed data loop is formed, which is helpful to deliver the Internet advertisements more accurately.

Figure 8:
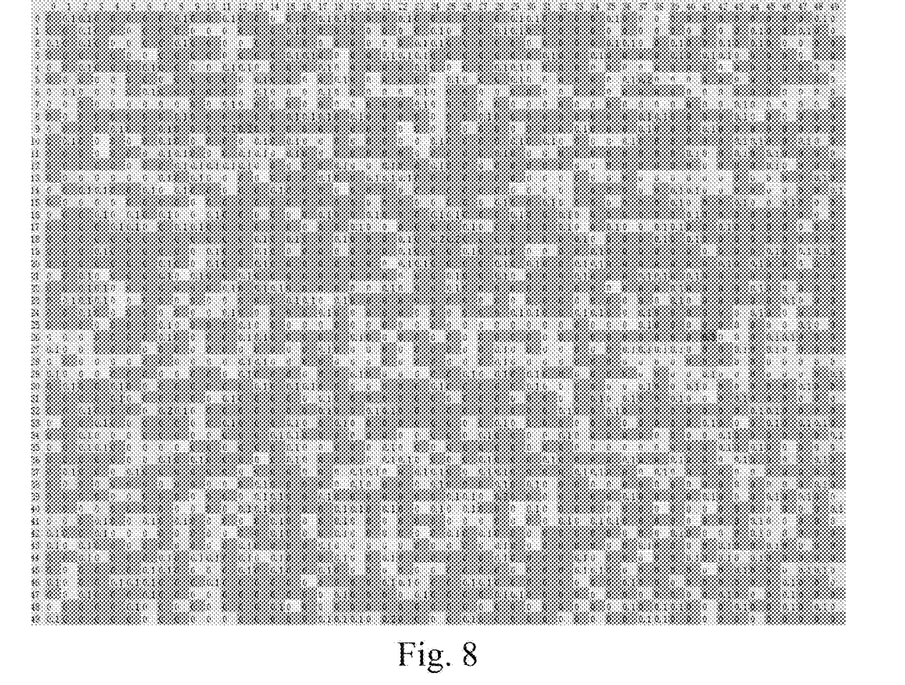
FIG. 8 is a schematic diagram illustrating a correlation matrix between a search topic and a consumption topic according to a fifth embodiment of the present disclosure.
Figure 9:
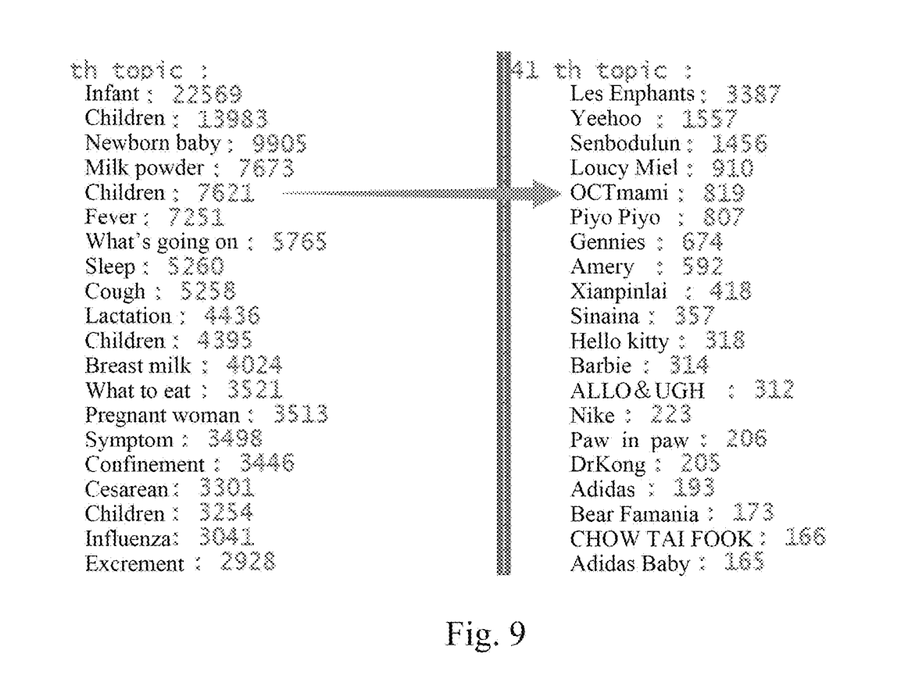
FIG. 9 is a first search diagram of a fifth embodiment of the present disclosure.
Figure 10:
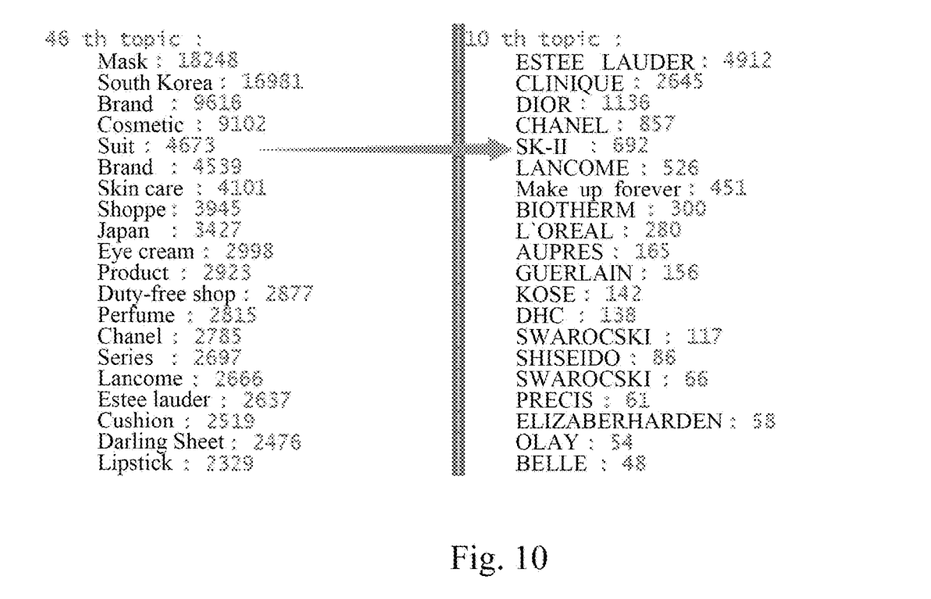
FIG. 10 is a second search diagram of a fifth embodiment of the present disclosure.

The effects of use of Baidu big data on the improvement of the offline retail efficiency is described as follows from the offline simulation test and online authentic test:

With an offline commercial retail property as an example, the consumption data and the Baidu search data of users of the property are subjected to onboarding, and a correlation matrix M between the search topic and the consumption topic is obtained by the modeling method according to the embodiment. As shown in FIG. 8, every line represents the probability distribution of 50 consumption topics corresponding to an online search topic, and there are totally 50 lines representing 50 search topics.

The greater the value in FIG. 8 is, the stronger the correlation is. The M (26, 41) and M (46, 10) in the matrix, for example, are used to describe the reasonability of the correlation.

M (26, 41) represents the correlation between a search topic marked with 26 and a consumption topic marked with 41, and the correlation as shown in FIG. 8 is very strong. The specific correlation is as follows:

In the matrix, M (26, 41) is 0.3, representing that user's consumption behavior in the left search words in the first search graph 9 has 30% of probability of falling into the right brands. It is not difficult to find from FIG. 9 that the left search topics are pregnancy, infant and children, while the right consumption topics are also pregnancy, infant and children, so that there is a good correlation.

M (46, 10) represents the correlation between a search topic marked with 46 and a consumption topic marked with 10, and the correlation as shown in the figure is very strong. The specific correlation is as follows:

In the matrix, M (46,10) is 0.2, representing that the user's consumption behavior in the left keywords in the second search graph 10 has 20% of probability of falling into the right brands. It is not difficult to find from FIG. 10 that the left search topics are makeup and skincare, while the right consumption topics are also makeup and skincare, so that there is a good correlation.

Besides, for the use of the modeling result in a mall in an offline emulation experiment, the brand recommendation accuracy is largely increased to 11.1% after adding the Baidu search data, compared with the accuracy (6.1%) of brand recommendation for mall members simply using an offline model in the prior art.

In the online true experiment, potential target customers are looked for according to the Children's Day promotion information in a mall, information is pushed to those customers, and the technical effect is measured by investigating the consumption rate of these target users in the mall. Compared with the accuracy (7.49%) of brand recommendation for mall members just based on member's consumption history, the consumption rate of user in the mall is largely increased to 11.6% after using the Baidu search data, and the increase amplitude is 54.8%.

In conclusion, adding the Baidu search data to mall consumption data obviously increases the accuracy of consumption recommendation for mall members and the precision of positioning potential customers in the brand promotion process, which indirectly promotes the GMV of a mall.

Figure 11:
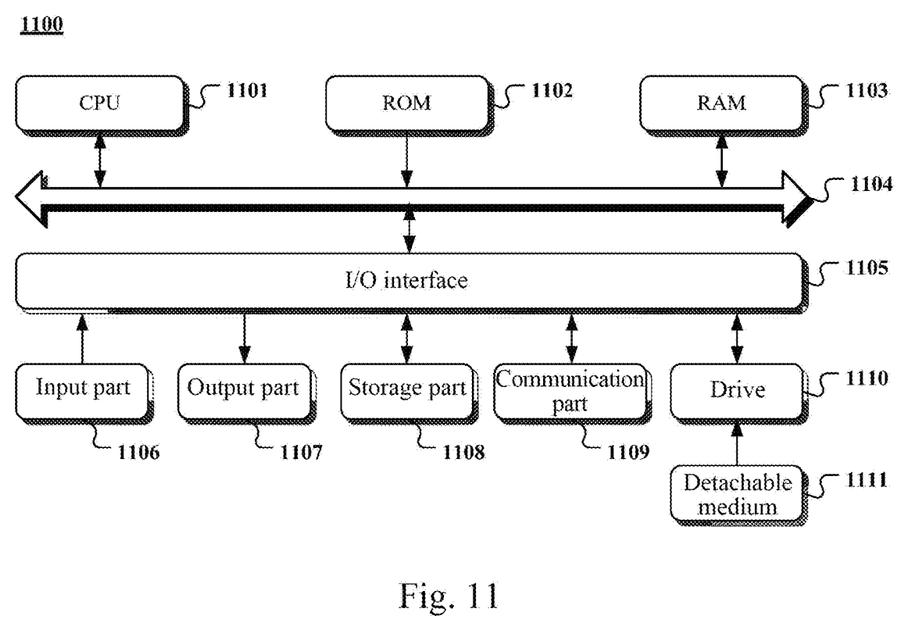
FIG. 11 is a structural diagram of a computer system suitable for implementing a big data based cross-domain recommendation method according to embodiments of the present disclosure.

Reference is made to FIG. 11 which is a structural diagram of a computer system 1100 suitable for implementing a big data based cross-domain recommendation method according to embodiments of the present disclosure.

As shown in FIG. 11, the computer system 1100 includes a central processing unit (CPU) 1101, which may execute various appropriate actions and processes in accordance with a program stored in a read-only memory (ROM) 1102 or a program loaded into a random access memory (RAM) 1103 from a storage portion 1108. The RAM 1103 also stores various programs and data required by operations of the system 1100. The CPU 1101, the ROM 1102 and the RAM 1103 are connected to each other through a bus 1104. An input/output (I/O) interface 1105 is also connected to the bus 1104.

The following components are connected to the I/O interface 1105: an input portion 1106 including a keyboard, a mouse etc.; an output portion 1107 comprising a cathode ray tube (CRT), a liquid crystal display device (LCD), a speaker etc.; a storage portion 1108 including a hard disk and the like; and a communication portion 1109 comprising a network interface card, such as a LAN card and a modem. The communication portion 1109 performs communication processes via a network, such as the Internet. A driver 1110 is also connected to the I/O interface 1105 as required. A removable medium 1111, such as a magnetic disk, an optical disk, a magneto-optical disk, and a semiconductor memory, may be installed on the driver 1110, to facilitate the retrieval of a computer program from the removable medium 1111, and the installation thereof on the storage portion 1108 as needed.

In particular, according to an embodiment of the present disclosure, the process described above with reference to FIG. 1 and FIG. 2 may be implemented in a computer software program. For example, an embodiment of the present disclosure includes a computer program product, which comprises a computer program that is tangibly embedded in a machine-readable medium. The computer program comprises program codes for executing the method as illustrated in FIG. 1 and FIG. 2. In such an embodiment, the computer program may be downloaded and installed from a network via the communication portion 1109, and/or may be installed from the removable media 1111.

The flowcharts and block diagrams in the figures illustrate architectures, functions and operations that may be implemented according to the system, the method and the computer program product of the various embodiments of the present invention. In this regard, each block in the flowcharts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor. The names of these units or modules are not considered as a limitation to the units or modules.

In another aspect, the present application further provides a non-volatile computer storage medium. The non-volatile computer storage medium may be the non-volatile computer storage medium included in the apparatus in the above embodiments, or a stand-alone non-volatile computer storage medium which has not been assembled into the apparatus. The non-volatile computer storage medium stores one or more programs. The one or more programs, when executed by a device, cause the device to execute the big data based cross-domain recommendation method according to the present application.

The technical means taken to realize the predetermined purpose of the present disclosure and the effects shall be understood more deeply and specifically by means of the detailed description of embodiments. However, the attached figures are merely for reference and description, not for limiting the present disclosure.

What is claimed is:
1. A big data based cross-domain recommendation method, comprising:
    modeling a topic separately based on an online input record and an offline behavior record of a user in a specific user set, the user in the specific user set having both the online input record and the offline behavior record;
    determining a transition probability of transitioning from each online input topic to each offline behavior topic according to a topic modeling result; and
    recommending content of an offline behavior to a target user based on the transition probability and an online input record of the target user.
2. The big data based cross-domain recommendation method according to claim 1, wherein the offline behavior record includes an offline consumption record; and
    the online input record includes a search record obtained by a search engine and/or an input record in a particular application obtained by an input method or a voice receiving device; and a type of the particular applica- tion includes at least one of the following: chat software, a search engine, social software and online shopping client software.

3. The big data based cross-domain recommendation method according to claim 2, wherein the offline consumption record includes an offline consumption topic and an offline consumption brand;

in case the online input record is a search record obtained by the search engine, the modeling a topic separately based on an online input record and an offline behavior record of the user in the specific user set comprises:

modeling a topic based on the offline consumption record of the user in the specific user set to obtain a probability P(brand |consumption topic) of consuming each brand in each consumption topic and a probability P(consumption topic |user) of consuming each consumption topic by each user; and modeling a topic based on an online search record of the user in the specific user set to obtain a probability P(search word |search topic) of inputting each search word in each search topic and a probability P(search topic |user) of searching each search topic by each user.

4. The big data based cross-domain recommendation method according to claim 3, wherein the determining a transition probability of transitioning from each online input topic to each offline behavior topic according to a topic modeling result comprises:

using a two-level probability graph model to obtain a transition probability P(consumption topic |search topic) from each search topic to each consumption topic, based on the P(search topic |user) corresponding to each user and the brand consumption data of the user in the specific user set, or based on the P(brand |consumption topic), the P(search topic|user) corresponding to the each user and the brand consumption data of the user in the specific user set.

5. The big data based cross-domain recommendation method according to claim 4, wherein the recommending content of an offline behavior to a target user based on the transition probability and an online input record of the target user comprises:

A1: determining a probability $P_0$(brand|user) of consuming each brand by the target user in accordance with a following formula:

$$P_0(\text{brand} | \text{user}) = \sum_{Consumption\ topic} \left[ \sum_{Search\ topic} \begin{array}{l} P(\text{brand} | \text{consumption topic}) \times \\ (P(\text{consumption topic} | \text{search topic}) \times \\ P_0(\text{search topic} | \text{user})) \end{array} \right]$$

wherein, $$\sum_{Consumption\ topic}$$

refers to a summation of all consumption topics involved in the offline behavior record of the user in the particular set, $$\sum_{Search\ topic}$$

refers to a summation of all search topics in the search record of the target user, and $P_0$(search topic |user) refers to a probability of searching each search topic by the target user as determined based on the search record of the target user; and A2: recommending a brand to the target user according to the $P_0$(brand|user).

6. The big data based cross-domain recommendation method according to claim 4, wherein in case the target user has an offline consumption record, the recommending content of an offline behavior to a target user based on the transition probability and an online input record of the target user comprises:

B1: determining a probability $P_0$(brand|user) of consuming each brand by the target user in accordance with a following formula:

$$P_0(\text{brand} | \text{user}) = \sum_{Consumption\ topic} \left[ \begin{array}{l} P_0(\text{brand} | \text{consumption topic}) \times \\ [P_0(\text{consumption topic} | \text{user}) + \sum_{Search\ topic} \\ (P(\text{consumption topic} | \text{search topic}) \times \\ P_0(\text{search topic} | \text{user}))] \end{array} \right]$$

wherein, $P_0$(brand|consumption topic) refers to a probability of consuming each brand in each consumption topic by the target user as determined according to the consumption record of the target user, $P_0$(consumption topic|user) refers to a probability of consuming each consumption topic by the target user as determined according to the consumption of the target user, $$\sum_{Consumption\ topic}$$

refers to the summation of all consumption topics involved in the offline behavior record of the user in the particular set, $$\sum_{Search\ topic}$$

refers to the summation of all search topics in the search record of the target user, and $P_0$(search|topic user) refers to the probability of searching each search topic by the target user as determined according to the search record of the target user; and B2: recommending a brand to the target user according to the $P_0$(brand|user).

7. A big data based cross-domain recommendation apparatus, comprising:

at least one processor; and a memory storing instructions, which when executed by the at least one processor, cause the at least one processor to perform operations, the operations comprising:

modeling a topic separately based on an online input record and an offline behavior record of a user in a specific user set, the user in the specific user set having both the online input record and the offline behavior record;

determining a transition probability of transitioning from each online input topic to each offline behavior topic according to a topic modeling result; and recommending content of an offline behavior to a target user based on the transition probability and an online input record of the target user.

8. The big data based cross-domain recommendation apparatus according to claim 7, wherein the offline behavior record includes an offline consumption record;

the online input record includes a search record obtained by a search engine, and/or an input record in a particular application obtained by an input method or a voice receiving device; and a type of the particular application includes at least one of the following: chat software, a search engine, social software and online shopping client software.

9. The big data based cross-domain recommendation apparatus according to claim 8, wherein the offline consumption record includes an offline consumption topic and an offline consumption brand;

in case the online input record is a search record obtained by the search engine, the modeling a topic separately based on an online input record and an offline behavior record of the user in the specific user set comprises:

modeling a topic based on the offline consumption record of the user in the specific user set to obtain a probability P(brand |consumption topic) of consuming each brand in each consumption topic, and a probability P(consumption topic |user) of consuming each consumption topic by each user; and modeling a topic based on an online search record of the user in the specific user set to obtain a probability P(search word |search topic) of inputting each search word in each search topic and a probability P(search topic |user) of searching each search topic by each user.

10. The big data based cross-domain recommendation apparatus according to claim 9, wherein the determining a transition probability of transitioning from each online input topic to each offline behavior topic according to a topic modeling result comprises:

using a two-level probability graph model to obtain a transition probability P(consumption topic|search topic) from each search topic to each consumption topic, based on the P(search topic|user) corresponding to each user and the brand consumption data of the user in the specific user set, or based on the P(brand|consumption topic), the P(search topic|user) corresponding to the each user and the brand consumption data of the user in the specific user set.

11. The big data based cross-domain recommendation apparatus according to claim 10, wherein the recommending content of an offline behavior to a target user based on the transition probability and an online input record of the target user comprises:

determining a probability $P_0$(brand|user) of consuming each brand by the target user in accordance with a following formula:

$$P_0(\text{brand} | \text{user}) = \sum_{\text{Consumption topic}} \left[ \sum_{\text{Search topic}} \begin{array}{c} P(\text{brand} | \text{consumption topic}) \times \\ (P(\text{consumption topic} | \text{search topic}) \times \\ P_0(\text{search topic} | \text{user})) \end{array} \right]$$

wherein, $$\sum_{\text{Consumption topic}}$$

refers to the summation of all consumption topics involved in the offline behavior record of the user in the particular set, $$\sum_{\text{Search topic}}$$

refers to the summation of all search topics in the search record of the target user, and $P_0$(search topic|user) refers to the probability of searching each search topic by the target user as determined according to the search record of the target user; and recommending a brand to the target user according to the $P_0$(brand|user).

12. The big data based cross-domain recommendation apparatus according to claim 10, wherein in case the target user has an offline consumption record, the recommending content of an offline behavior to a target user based on the transition probability and an online input record of the target user comprises:

B 1: determining a probability $P_0$(brand|user) of consuming each brand by the target user in accordance with a following formula:

$$P_0(\text{brand} | \text{user}) = \sum_{\text{Consumption topic}} \left[ \begin{array}{c} P_0(\text{brand} | \text{consumption topic}) \times \\ [P_0(\text{consumption topic} | \text{user}) + \sum_{\text{Search topic}} \\ (P(\text{consumption topic} | \text{search topic}) \times \\ P_0(\text{search topic} | \text{user}))] \end{array} \right]$$

wherein, $P_0$(brand |consumption topic) refers to a probability of consuming each brand in each consumption topic by the target user as determined according to the consumption record of the target user, $P_0$(consumption topic |user) refers to a probability of consuming each consumption topic by the target user as determined according to the consumption of the target user, $$\sum_{\text{Consumption topic}}$$

refers to the summation of all consumption topics involved in the offline behavior record of the user in the particular set, $$\sum_{Search\ topic}$$

refers to the summation of all search topics in the search record of the target user, and $P_0$(search topic|user) refers to the probability of searching each search topic by the target user as determined according to the search record of the target user; and B2: recommending a brand to the target user according to the $P_0$(brand|user).

13. A non-volatile computer storage medium storing a computer-readable instruction capable of being executed by a processor, wherein when the computer-readable instruction is executed, the processor executes a big data based cross-domain recommendation method, the method comprising:

modeling a topic separately based on an online input record and an offline behavior record of a user in a specific user set, the user in the specific user set having both the online input record and the offline behavior record;

determining a transition probability of transitioning from each online input topic to each offline behavior topic according to a topic modeling result; and recommending content of an offline behavior to a target user based on the transition probability and an online input record of the target user.

* * * * *